United States Patent
Ishikawa

(10) Patent No.: US 6,600,835 B1
(45) Date of Patent: Jul. 29, 2003

(54) MOVING-PICTURE COMPRESSING TECHNIQUE

(75) Inventor: Hiroyuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/501,939

(22) Filed: Feb. 10, 2000

(30) Foreign Application Priority Data

Feb. 10, 1999 (JP) ............................................ 11-033530

(51) Int. Cl.⁷ ................................................. G06K 9/36
(52) U.S. Cl. ...................................................... 382/236
(58) Field of Search ................................ 382/232, 233, 382/236, 238, 240, 242, 248, 250; 348/384.1, 394.1, 395.1, 400.1–404.1, 407.1–416.1, 420.1, 421.1, 425.2, 430.1, 431.1

(56) References Cited

U.S. PATENT DOCUMENTS

| | | | |
|---|---|---|---|
| 5,453,792 A | * 9/1995 | Gifford et al. | 348/441 |
| 5,568,165 A | * 10/1996 | Kimura | 345/185 |
| 5,767,863 A | * 6/1998 | Kimura | 345/507 |
| 5,828,381 A | * 10/1998 | Penna | 345/473 |
| 5,966,178 A | * 10/1999 | Tashima et al. | 348/403 |

FOREIGN PATENT DOCUMENTS

| | | |
|---|---|---|
| JP | 7-50839 | 2/1995 |
| JP | 7-177514 | 7/1995 |
| JP | 8-140100 | 5/1996 |
| JP | 8-242452 | 9/1996 |
| JP | 8-307878 | 11/1996 |
| JP | 8-336138 | 12/1996 |
| JP | 10-136380 | 5/1998 |
| JP | 10-257499 | 9/1998 |
| JP | 10-304375 | 11/1998 |

* cited by examiner

*Primary Examiner*—Jose L. Couso
(74) *Attorney, Agent, or Firm*—Scully, Scott, Murphy & Presser

(57) ABSTRACT

A compression-encoding method allowing any discrepancy such as a delay caused by a change in frame rate to be avoided is disclosed. It is determined whether a predetermined number of frames required for forming a GOP have been inputted and, when the predetermined number of frames have not been all supplied, a dropped frame is compensated for by interpolation of a proceeding frame previous to the dropped frame to produce an interpolated group of pictures. Each frame of the interpolated GOP is compression-encoded to produce encoded moving picture data to be stored into a memory.

17 Claims, 13 Drawing Sheets

FIG. 6

| | SYMBOLS | BIT LENGTH | CODES |
|---|---|---|---|
| PICTURE LAYER | PSC | 32BIT | 00000100 (H) |
| | TR | 10BIT | 1 |
| | PCT | 3BIT | 011 |
| | VD | 16BIT | 48000 (D) |
| | FPFV | 1BIT | 0 |
| | FFC | 3BIT | 001 |
| | FPBV | 1BIT | 0 |
| | BFC | 3BIT | 011 |
| | EBP | 1BIT | 0 |
| SLICE LAYER | SSC | 32BIT | 000001AF (H) |
| | QS | 5BIT | 16 (D) |
| | EBS | 1BIT | 0 |
| MACRO BLOCK LAYER | MBAI | 1BIT | 1 |
| | MBTYPE | 4BIT | 0010 |
| | QS | 5BIT | 0 |
| | MHF | 1BIT | 0 |
| | MVF | 1BIT | 0 |
| | MB ESC | 11BIT | 0000 0001 000 |
| | MB ESC | 11BIT | 0000 0001 000 |
| | MBAI | 4BIT | 13 (D) |
| | MBTYPE | 4BIT | 0010 |
| | QS | 5BIT | 0 |
| | MHF | 1BIT | 0 |
| | MVF | 1BIT | 0 |

MBTYPE
- MBQUANT 1BIT 0
- MBFV 1BIT 1
- MBBV 1BIT 0
- MBP 1BIT 0
- MBINTRA 1BIT 0

FIG. 9

22 GOP STRUCTURE TABLE

| ACTUAL FRAME RATE [fps] | DESIGNED FRAME RATE [fps] | GOP STRUCTURE |
|---|---|---|
| 8 | 24 | IBBBPBBBP... |
| 10 | 30 | IBBPBBBP... |
| 15 | 30 | IBPBPBPBP... |

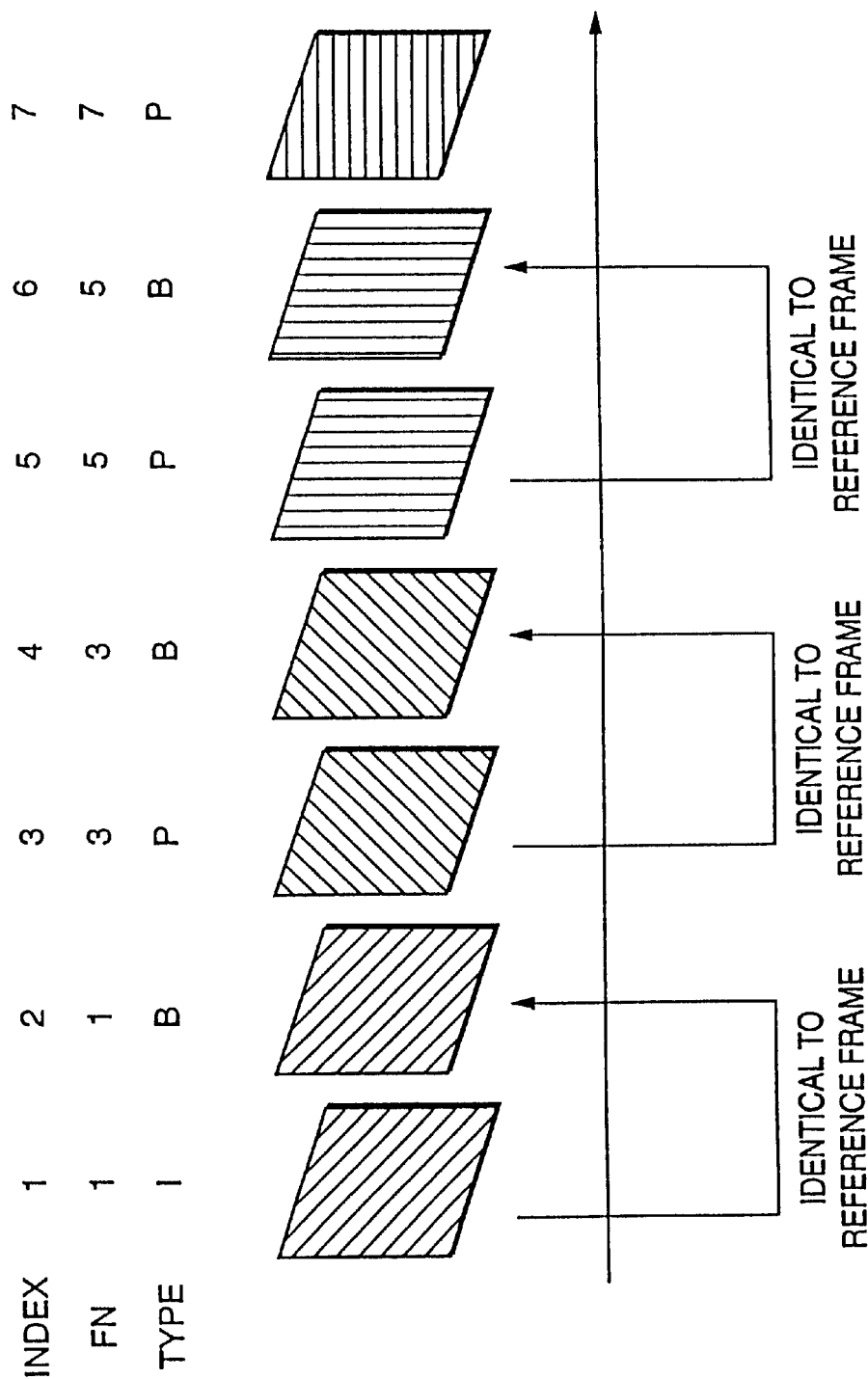

MOVING-PICTURE COMPRESSING TECHNIQUE

BACKGROUND OF THE INVENTION

1. Field of the Invention

The present invention relates to a moving picture compression technique, and particularly to a method and apparatus for compression-encoding a moving picture supplied in real time after dividing it in units of a plurality of frames.

2. Description of the Related Art

There have been proposed several conventional moving picture compressing apparatuses for compression-encoding a moving picture supplied in real time as disclosed, for example, in Japanese Patent Application Laid-open No. 7-177514, No. 8-307878, No. 8-336138, and No. 10-136380. The details of these publications will be described.

A moving picture compressing apparatus disclosed in the above Publication No. 7-177514 is arranged such that frame decimation is performed during compression encoding of a moving picture and the compression-encoded data is transmitted to a receiver. At the receiver, the compression-encoded data is decoded and expanded to reproduce the original moving picture by interpolating frames decimated in the compression encoding. The interpolation is performed such that the frames to be interpolated are obtained by approximating the motion of a motion vector calculated from the adjacent frames to a curve representation and determining a ratio of the distances from a frame to be interpolated to adjacent frames. In the above arrangement, when a moving picture including a curved movement such as a circular or parabola motion is received, its frames subtracted for decimation at a transmitter can precisely be restored. Hereafter, this moving picture compressing apparatus disclosed in the above Publication No. 7-177514 is referred to as a first prior art.

An image-coding device disclosed in the above Publication No. 8-307878 is arranged such that the compression-encoding of a moving picture is performed with the use of intra-frame encoding mode and inter-frame encoding mode with motion compensation prediction. More specifically, a frame to be compression-encoded in the intra-frame encoding mode is compression-encoded in the inter-frame encoding mode when a difference between the generated code estimated amount of the frame of interest and the estimated amount of the past frame is small to the extent that its scene has small movements, and the frame of interest is not a scene change frame. In the above arrangement, when a moving picture includes a succession of still pictures, it can be compression-encoded at a higher quality. Hereafter, this image-coding device disclosed in the above Publication No. 8-307878 is referred to as a second prior art.

A moving image compression device disclosed in the Publication No. 8-336138 is arranged such that a moving picture is divided in units of a group of pictures (GOP) consisting of a plurality of frames before compression encoding. The number of frames which constitute one group of pictures GOP of interest is determined depending on the time code indicating a drop frame, which is predicted and detected from the time codes each indicating the stamped times attached to the frames.

More specifically, a group of pictures GOP is a group of frames for enabling random accessing or trick action modes including fast forwarding, rewinding, playback from midway, and reverse playback. In the NTSC (National Television System Committee) system which is employed for television broadcasting in Japan and U.S.A., the number of frames per second is 29.97 at maximum and the group of pictures GOP thus consists of approximately 30 frames for a length of one second. Since the number of frames in the group of pictures GOP is not a neat number, editing the frames e.g. of a broadcasting program in a duration of an integer number of minutes or seconds develops partially not continuous movements in a moving picture. For avoiding such a drawback, the frames should be decimated to a desired number and subtracted frames by the decimation are called dropped frames. Each frame is identified with a time code comprising four numbers: hours, minutes, seconds, and frame number. It is determined by prediction and identification whether or not the time codes assigned to dropped frames are received. When a dropped frame is found, the number of frames in the group of pictures GOP is changed. In the above arrangement, an integer number of minutes or seconds in the time code can be matched with the boundary of groups of pictures GOPs hence enabling the post editing of a signal (of bit stream) produced by the compression encoding with ease. This moving image compression device is referred to as a third prior art hereinafter.

A moving image encoding device disclosed in the above Publication No. 10-136380 is arranged such that compression-encoded data can be received at a constant frame rate even when an input picture cannot be received at a constant frame rate. More specifically, in the case of a loss of frame of data which is to be continuously inputted, the necessary encoded data is produced by copying previous or subsequent frames of data or by sending information indicating that it is the same image as the previous or subsequent frame. This moving image encoding device is referred to as a fourth prior art hereinafter.

A variety of moving picture compressing methods have been proposed depending on applications and characteristics of transmission lines over which moving picture data are transmitted. Characterized examples of such a moving picture compressing method with the use of CD-ROMs, DATs, (digital audio tapes), and hard disks as recording mediums are MPEG (Moving picture Experts Group) 1 and its new version, MPEG2, which are developed for data storage and standardized by ISO (International Organization for Standardization). The second and third prior arts described above both conform to the MPEG standards. In the MPEG standards, the number of frames per second to be received is predetermined (hence referred to as a frame rate hereinafter).

However, when the frame rate which is predetermined is changed due to a loss of some of the frames to be received by dropping or any other reason, not by intentional decimation of the frames such as schemed with the first or third prior arts, if it is used without correction in the compression encoding, then there will be developed a time discrepancy such as a delay in the time information at the receiver or playback apparatus. The drawback like this may appear in such a moving picture compressing apparatus as composed of a software architecture when a series of moving pictures are continuously received in real time from a source such as a video camera and subjected in a succession to the compression encoding. The low processing speed of a CPU (central processing unit) or a heavy load on the CPU due to multitask processing in parallel causes the speed of receiving the picture data to be decreased or prevents the picture data from being received at a constant speed.

The first prior art allows the frames decimated intentionally at the transmitter to be restored by interpolation at the receiver but has no scheme for compensating frames dropped with no intention at the transmitter, hence hardly accommodating changes in the frame rate. The second prior art also has no scheme for restoring dropped frames before the compression encoding, hence rarely making up for a change in the frame rate.

In the advanced moving picture compressing apparatus composed of a software architecture, its CPU is heavily loaded and takes more time to carry out the compression encoding of frames with the speed of receiving a moving picture being retarded, hence making the compression encoding of the moving picture in real time more difficult.

The third prior art allows the number of frames in an group of pictures GOP to be modified, when frames decimated intentionally (dropped frames) are found before the compression encoding, and thereby the right end of minutes or seconds of a time code is matched with the boundary of the group of pictures GOP. Since the remaining of the frames not subtracted is normally subjected to the compression encoding, reduction of the amount of data to be processed or minimizing the overall time required for the compression encoding will be difficult.

The fourth prior art sends information indicating that a dropped frame is the same image as the previous or subsequent frame to produce the necessary encoded data. Therefore, in the case of predicative encoding, a time distance between key frames (I-pictures) or sub-key frames (P-frames) becomes too long, resulting in remarkably reduced encoding efficiency and thereby deteriorated quality of image. Further, the dropped frame is nothing but B-frame because the dropped frame cannot be a reference frame. Therefore, the larger the number of dropped frames, the larger the number of consecutive B-frames inserted, causing the position of P-frame to be shifted backward.

SUMMARY OF THE INVENTION

It is thus an object of the present invention to provide a moving-picture compressing method and apparatus allowing discrepancy such as a delay in time information caused by a change in frame rate to be avoided, the amount of data to be processed to be reduced, and the overall time required for carrying out the compression encoding to be minimized.

According to the present invention, a method for compression-encoding a moving picture supplied in real time, wherein the moving picture is divided in units of a group of pictures consisting of a plurality of frames, comprises the steps of:

a) determining whether a predetermined number of frames required for forming a group of pictures have been inputted;

b) when the predetermined number of frames have not been all supplied, compensating for a dropped frame by interpolation of a proceeding frame previous to the dropped frame to produce an interpolated group of picture; and c) compression-encoding each frame of the interpolated group of pictures to produce encoded moving picture data.

In the step c), an interpolated frame is preferably represented by information indicating that it is identical to the proceeding frame.

According to an aspect of the present invention, a method for compression-encoding a moving picture supplied in real time, wherein the moving picture is divided in units of a group of pictures consisting of a predetermined number of frames, comprises the steps of:

a) adding a frame number to each frame of the moving picture based on time information to each frame and a predetermined frame rate;

b) determining whether the predetermined number of frames required for forming a group of pictures have been all inputted, by referring to a frame number of each frame;

c) when the predetermined number of frames have not been all inputted, compensating for a dropped frame by interpolation of a proceeding frame previous to the dropped frame to produce an interpolated group of pictures; and d) compression-encoding each frame of the interpolated group of pictures to produce encoded moving picture data to be stored.

According to another aspect of the present invention, a method for compression-encoding a moving picture supplied in real time, wherein the moving picture is divided in units of a group of pictures consisting of a predetermined number of frames, comprises the steps of:

a) determining whether a current frame is a head of a group of pictures;

b) when the current frame is the head of the group of pictures, obtaining an actual frame rate measured in a previous group of pictures;

c) modifying a structure of the group of pictures depending on a combination of the actual frame rate and a predetermined frame rate;

d) adding a frame number to each frame of the moving picture based on time information for each frame and the predetermined frame rate;

e) determining whether the predetermined number of frames required for forming a group of pictures have been all inputted, by referring to a frame number of each frame;

f) when the predetermined number of frames have not been all inputted, compensating for a dropped frame by interpolation of a proceeding frame previous to the dropped frame to produce an interpolated group of pictures; and g) compression-encoding each frame of the interpolated group of pictures to produce encoded moving picture data to be stored.

A type of each frame of a group of pictures is one of Intra type, Predictive type, and Bidirectionally predictive type. In the step c), the structure of the group of pictures is preferably modified such that an interpolated frame is of Bidirectionally predictive type. In the step g), an interpolated frame is preferably represented by information indicating that it is identical to the proceeding frame.

According to the present invention, the arrangement of the present invention permits the data to be compression-encoded after its dropped frames have been interpolated. Therefore, even if the frame rate is changed, any discrepancy such as a delay in the time information which may be caused by the change in the frame rate can be prevented.

Also, according to the present invention, a dropped frame is restored by copying the preceding frame and thus the compression encoding of the present frame is not needed hence decreasing the overall processing time. In addition, the amount of data which indicates the identicalness of the frames is small and the overall amount of the data will successfully be reduced. This allows the compression encoding of the frames to be carried out at a higher speed and the amount of data saved by the reduction can be used for the other frames, hence ensuring the compression encoding of a high picture quality.

According to the other aspect of the present invention, the structure of an group of pictures is dynamically modified in response to the actual frame rate, hence decreasing the amount of the data to be processed and increasing the efficiency and speed of the compression processing to minimize the overall time required for the compression encoding.

BRIEF DESCRIPTION OF THE DRAWINGS

FIG. 6 is a diagram showing a set of codes in a B-frame of data BFD where the differential data is zero;

FIG. 9 is a diagram showing a GOP structure table;

FIG. 13 is a view explaining the action of the apparatus.

DESCRIPTION OF THE PREFERRED EMBODIMENTS

Embodiments according to the present invention will be described in conjunction with the relevant drawings. The description is practically made referring to preferred embodiments of the present invention.

FIRST EMBODIMENT

Figure 1:
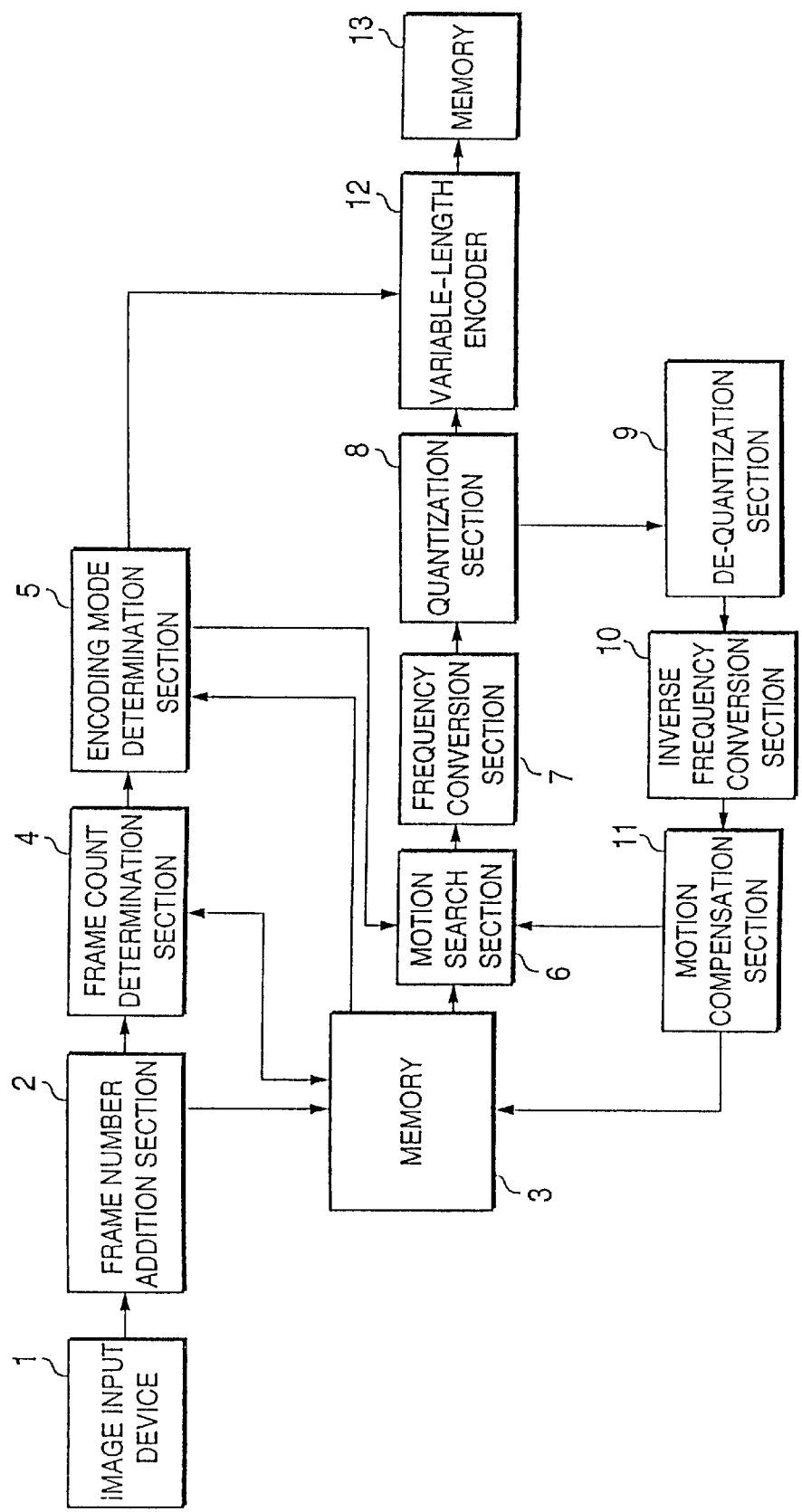
FIG. 1 is a block diagram of an electrical arrangement of a moving picture compressing apparatus according to a first embodiment of the present invention.

FIG. 1 is a block diagram of an electrical arrangement of a moving picture compressing apparatus according to a first embodiment of the present invention.

The moving picture compressing apparatus includes image input device 1, frame number addition section 2, memory 3, frame count determination section 4, encoding mode determination section 5, motion search section 6, frequency conversion section 7, quantization section 8, de-quantization section 9, inverse frequency conversion section 10, a motion compensation section 11, variable-length encoder 12, and memory 13.

The image input device 1 includes an analog-to-digital (A/D) converter and receives frame by frame an analog video signal from a signal source such as a video camera (not shown) and converts the received analog video signal to a digital signal composed of frames of data FD. The signal source supplies a succession of moving pictures in real time.

The frame number addition section 2 includes time information acquiring means, such as a timer, for acquiring absolute time information of the frame of data FD received from the image input device 1 or relative time information from the head of the frames of data FD where the process is started. The frame number addition section 2 adds a frame number FN to each frame of the frames of data FD according to the time information and the frame rate previously designated to this moving picture compressing apparatus. The frame number addition section 2 also stores the frames of data FD received from the image input device 1 and their corresponding frame numbers FNs into the memory 3. The memory 3 may be a semiconductor memory such as a RAM, a hard disk or the like.

The frame count determination section 4 determines, based on the frame number FN received from the frame number addition section 2, whether a predetermined number of frames in the frame of data FD are received and whether a frame number equal to or higher than the predetermined frame number FN is received.

The encoding mode determination section 5 performs interpolation pre-processing and then encoding mode decision. More specifically, if it is determined from a result of the frame count determination section 4 that a frame of data FD required for carrying out the compression encoding is lost, then the interpolation pre-processing is performed such that the present frame of data $FD_P$ is replaced with the preceding frame of data $FD_B$ identified by the frame number $FN_B$ preceding the frame number $FN_P$ of the present frame of data $FD_P$. Thereafter, the encoding mode determination section 5 also determines an encoding mode from the type and frame numbers of the frames of data FD consisting of the predetermined numbers of frames obtained by the above interpolation pre-processing.

The motion search section 6 determines correlation between the present frame of data $FD_P$ and the preceding frame of data $FD_B$ of the preceding frame number $FN_B$ which has been restored by the motion compensation section 11 and stored as a reference frame of data RFD in the memory 3. Then the motion search section 6 outputs its differential data from that of a highly correlated block to the frequency conversion section 7. The frequency conversion section 7 conducts frequency conversion of the differential data received from the motion search section 6 and outputs its frequency converted data to the quantization section 8.

The quantization section 8 quantizes the frequency converted data received from the frequency conversion section 7 and outputs its quantized data to the de-quantization section 9 and the variable-length encoder 12. The de-quantization section 9 de-quantizes the quantized data of the quantization section 8 to produce a reference frame of data RFD which is used for compression-encoding of the subsequent frame of data $FD_N$. The inverse frequency conversion section 10 carries out inverse frequency conversion for shifting a frequency component of the output of the de-quantization section 9 to a pixel-base component.

The motion compensation section 11 produces a reference frame of data RFD (local decoded data) from the output of the inverse frequency conversion section 10 and stores it in the memory 3.

The variable-length encoder 12 performs compression encoding of the frame of data FD received from the quantization section 8 according to information received from the encoding mode determination section 5. Further, if the encoding mode determination section 5 determines that the frame of data FD to be compression-encoded is identical to the reference frame of data RFD, then the variable-length encoder 12 produces only header information indicative of the fact that the frame of data FD is identical to the reference frame of data RFD. The resultant compression-encoded data or the header information is stored into the memory 13 which may be a hard disk or an optical disk.

Operation

An operation of the moving picture compressing apparatus having the above mentioned arrangement will now be described. In this embodiment, frames of data FD are produced by the image input device 1 processing a video signal supplied from a video camera conforming to the NTSC system. Thereafter, the frames of data FD are subjected to the MPEG1 compression encoding as described above. It is assumed that the frame rate designated to the moving picture compressing apparatus is 30 fps (frames per second).

Let us explain the MPEG1 system briefly before the operation of the embodiment.

Figure 3:
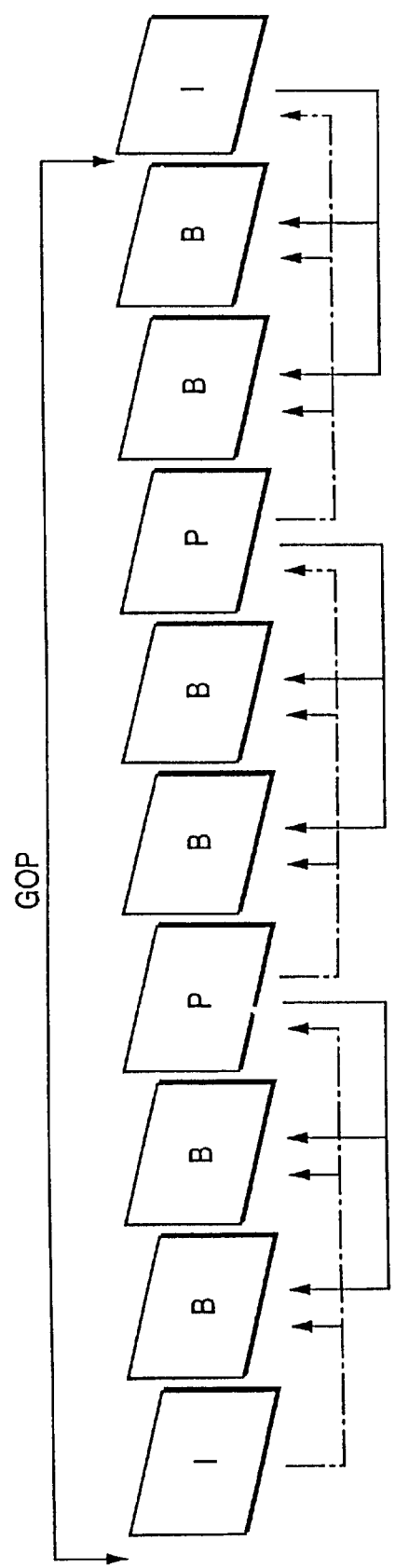
FIG. 3 is a view showing a group of frames in MPEG1 system.

FIG. 3 illustrates a frame sequence in MPEG1. In MPEG1, a frame of data FD is classified into I (Intra) type, P (Predictive) type, and B (Bidirectionally predictive) type. Also, the group of pictures GOP consists mainly of a single frame of I type frame of data FD (referred to as I-frame of data IFD), a plurality of consecutive frames of B type frame of data FD (referred to as B-frame data BFD), and a plurality of frames of P type frame of data FD (referred to as P-frame of data PFD), each of the P-frames of data is sandwiched between adjacent groups of the B-frames of data BFD. It is assumed in this embodiment that a group of pictures GOP is composed of one I-frame of data IFD, three sets of two consecutive B-frames of data BFD (that is, six B-frames of data BFD in total), and two P-frames of data PFD.

An I-frame of data IFD is produced by compression-encoding information closed in a single frame of data FD without use of a reference frame of data RFD (Intra-frame encoding mode).

A P-frame of data PFD, as shown in FIG. 3, is produced by compression-encoding the previous I-frame of data IFD or P-frame of data PFD as the reference frame of data RFD as denoted by the one-dot chain lines in FIG. 3 (Forward-directional inter-frame encoding mode using the motion compensation prediction). Further, A B-frame of data BFD is produced by compression-encoding the previous and succeeding frames of data IFD or PFD as a reference frame of data RFD as denoted by the one-dot chain lines and the real lines in FIG. 3 (Bidirectional inter-frame encoding mode using motion compensation prediction). The B-frame of data BFD itself is not used as the reference frame of data RFD.

As explained above, MPEG1 system uses the previous or succeeding frame of data IFD or PFD as a reference frame of data RFD to generate a B-frame of data BFD. The minimum number of frames required for constructing the group of pictures GOP is determined depending on the number of the consecutive B-frames of data BFD in each group.

Figure 4:
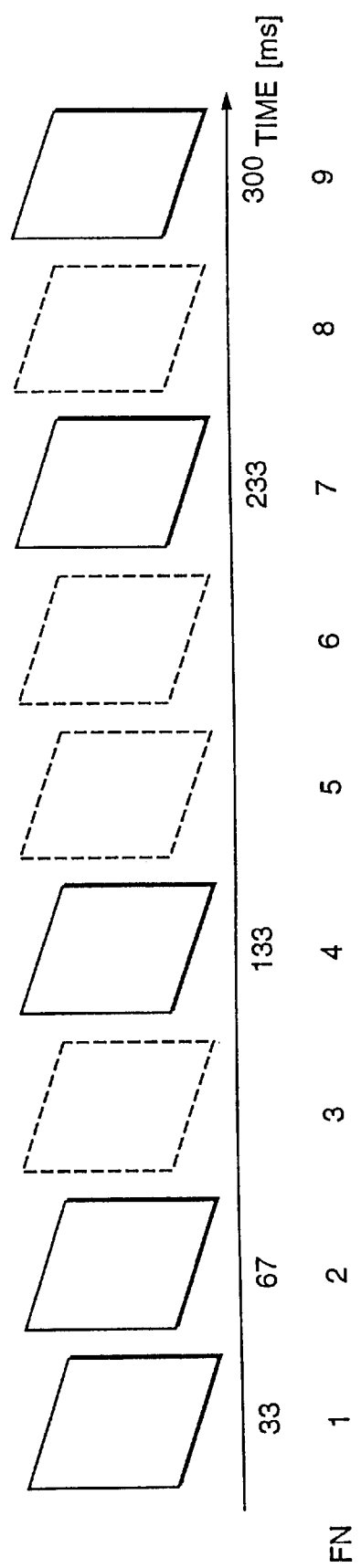
FIG. 4 is a view explaining the action of the apparatus.

An operation of the moving picture compressing apparatus when a sequence of the frames of data FD shown in FIG. 4 is captured by the image input device 1 will be described referring to FIGS. 1–4. In FIG. 4, each parallelogram block denoted by solid line represents the location of a frame of data FD on the time axis while each parallelogram block denoted by broken line represents the location of a dropped frame of data FD on the time axis.

Figure 2:
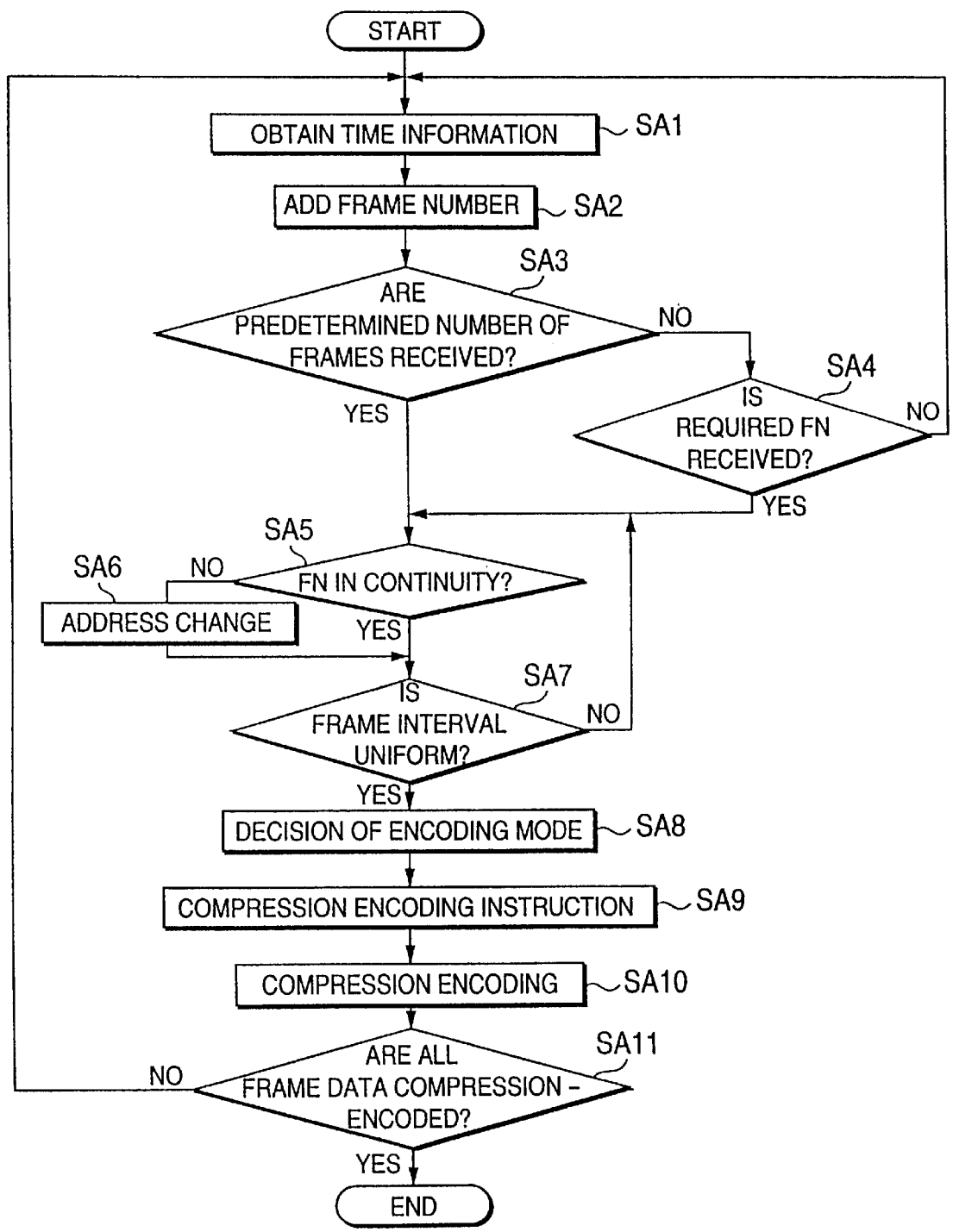
FIG. 2 is a flowchart showing the action of the apparatus.

Referring to FIG. 2, the frame number addition section 2 acquires the absolute or relative time information of each frame of data FD received from the image input device 1 (Step SA1) and provides each frame of data FD with a corresponding frame number FN based on the absolute or relative time information acquired and the frame rate designated to the moving picture compressing apparatus (30 fps in this embodiment) (Step SA2).

In the embodiment as shown in FIG. 4, frames of data FD are received at 33 ms, 67 ms, 133 ms, 233 ms, and 300 ms and their frame numbers FNs are 1(=(30/1000)×33), 2(=(30/1000)×67), 4(=(30/1000)×133), 7(=(30/1000)×233), and 9(=(30/1000)×300), respectively, where it should be noted that "=" indicates that both sides are substantially equal to each other.

The frame number addition section 2 stores the frame of data FD received from the image input device 1 and their frame numbers FN into the memory 3 (Step SA2).

This allows the frame count determination section 4 to determine, based on frame numbers FNs sequentially read from the memory 3, whether the predetermined number of frames of data FD required for forming a group of pictures GOP is received or not (Step SA3). In this case as shown in FIG. 4, nine (9) frames of data FD denoted respectively by the frame numbers 1 to 9 are needed to form the group of pictures GOP during the time interval from the relative time 33 ms to 300 ms. However, only the frames of data FD denoted respectively by the frame numbers 1, 2, 4, 7, and 9 are received so far. In other words, only 5 out of the 9 frames of data FD respectively numbered 1 to 9 have been received. Accordingly, the frame count determination section 4 determines that the predetermined number (9 in this embodiment) of the frames of data FD are not all received.

The frame count determination section 4, when determining that the predetermined number of the frames of data FD are not all received, further determines whether a frame number higher than the predetermined frame number FN which should be received to form the group of pictures GOP has been received or not (Step SA4). These determination steps SA3 and SA4 are made by the frame count determination section 4 because of the following reason.

Even if it is determined that the predetermined number of the frame of data FD is not received, there are cases where the frames of the data FD are not supplied at a constant frame rate when some frames are lost e.g. by dropping during the receipt of an analog video signal on a frame-by-frame basis.

There may be a case that the frame of data FD denoted by the predetermined frame number FN has been received while not all the frames of data required for restoring the group of pictures GOP are received. It is hence determined whether a frame number higher than the predetermined frame number FN which is assigned to a frame of data FD required for restoring the group of pictures GOP is received or not.

As shown in FIG. 4, the frame of data denoted by the predetermined frame number (FN=9 in this embodiment) which is needed to form the group of pictures GOP has been received. Therefore, the frame count determination section 4 determines that an extra frame number higher than the predetermined frame number FN is supplied.

On the other hand, if an extra frame number higher than the predetermined frame number FN is not received, the frame count determination section 4 waits for receiving the succeeding frame number FN.

Figure 5:
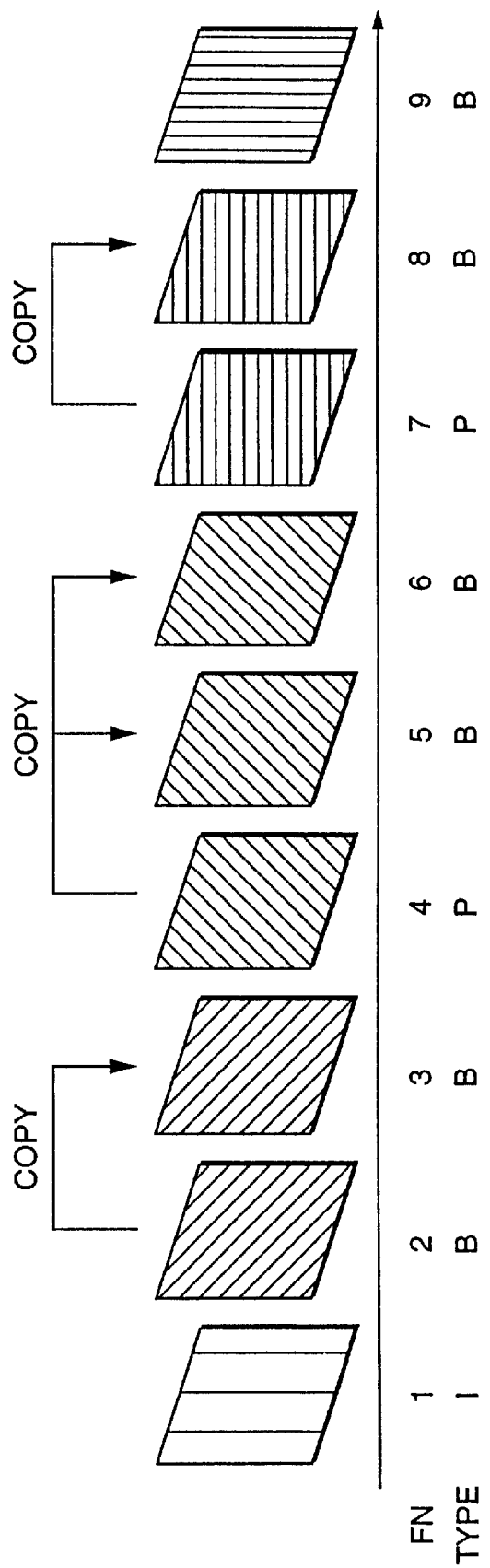
FIG. 5 is a view explaining the action of the apparatus.

When the frame count determination section 4 determines that the predetermined number of frames of data FD for forming the group of pictures GOP have been supplied, or that a frame number higher than the predetermined frame number FN has been supplied, the encoding mode determination section 5 determines whether the frame numbers FN stored in the memory 3 are consecutive in the order in which the frames of data FD were supplied (Step SA5). In this stage, since the frame numbers FN are 1, 2, 4, 7, and 9 as shown in FIG. 4, the encoding mode determination section 5 determines that the frame numbers FN are not consecutive. When the frame numbers FN are not consecutive, the encoding mode determination section 5 performs the address change operation of the memory 3 such that the address of the frame of data $FD_P$ denoted by the present frame number $FN_P$ which is lost presently in the memory 3 is made equal to the address of the frame of data $FD_B$ denoted by the preceding frame number $FN_B$ (Step SA6). More specifically, in this embodiment, the address of the frame of data FD denoted by the frame number FN=3 is made equal to the address of the frame of data FD denoted by the frame number FN=2 as shown in FIG. 5.

After it is determined that the frame numbers FN are consecutive or after the address change is completed, the encoding mode determination section 5 determines whether the frames of data FD used to form the group of pictures GOP are aligned at equal intervals (Step SA7). By now, the frame of data FD denoted by the frame number FN=2 is copied to generate the frame of data FD denoted by the frame number FN=3. As the three frames of data FD denoted respectively by the frame numbers FN=5, 6, and 8 are lost, the encoding mode determination section 5 determines that the frames of data FD are not aligned at equal intervals.

If it is determined that the frames of data FD are not aligned at equal intervals (NO in step SA7), then the encoding mode determination section 5 repeatedly performs the steps SA5 and SA6 until it is determined that the frames of data FD are positioned at equal intervals.

In this case, the frames of data FD denoted by the frame numbers FN=5 and 6 are made equal in the address of the frame of data FD denoted by the frame number FN=4 and the frame of data FD denoted by the frame number FN=8 is made equal in the address of the frame of data FD denoted by the frame number FN=7.

When it is determined that the frames of data FD are positioned at equal intervals (YES in step SA7), the encoding mode determination section 5 determines an encoding mode of the predetermined number of frames of data FD which have been pre-processed, based on their types and frame numbers FN (Step SA8). The group of pictures GOP in this embodiment consists of one I-frame of data IFD, six B-frames of data BFD, and two P-frames of data PFD as shown in FIG. 3. Accordingly, the encoding mode determination section 5 selects the intra-frame encoding mode for the I-frame of data IFD denoted by FN=1, the inter-frame encoding mode with motion compensation prediction for the B-frames of data BFD denoted by FN=2, 3, 5, 6, 8, and 9, and the inter-frame encoding mode with motion compensation prediction for the P-frames of data PFD denoted by FN=4 and 7.

In MPEG1 system, the sequence of the frame numbers FN before the compression encoding does not coincide with the sequence of frames of data FD in the group of pictures GOP produced by the compression encoding. Since the compression encoding is not particularly featured in the present invention, the descriptions will be made for simplicity assuming that the sequence of the frame numbers FN before the compression encoding is coincided with the sequence of the frame numbers FN of frames of data FD in the group of pictures GOP produced by the compression encoding.

The encoding mode determination section 5 further determines whether the frame of data FD to be compression-encoded is identical to its reference frame of data RFD stored in the memory 3. If it is determined that the frame of data FD is not identical to the reference frame of data RFD, then the encoding mode determination section 5 instructs the sections downstream from the motion search section 6 to carry out a normal procedure of the compression encoding as explained below. If it is determined that the frame of data FD is identical to the reference frame of data RFD, then the encoding mode determination section 5 instructs the variable-length encoder 12 to generate header data indicative of the same frame of data FD (Step SA9).

More specifically, when the encoding mode determination section 5 determines that the frame of data FD is not identical to the reference frame of data RFD, the motion search section 6 calculates correlation between the present frame of data $FD_P$ and the frame of data $FD_B$ denoted as the reference frame of data RFD by the preceding frame number $FN_B$ and outputs its differential data from a highly correlated block to the frequency conversion section 7. Then, the frequency conversion section 7 performs frequency conversion of the differential data, the quantization section 8 quantizes the frequency converted data received from the frequency conversion section 7, and the de-quantization section 9 performs de-quantization of the output of the quantization section 8. The inversion frequency conversion section performs inverse frequency conversion of a frequency component of the output of the de-quantization section 9 to a pixel-base component. The motion compensation section 11 produces a reference frame of data RFD from an output of the inverse frequency conversion section 10 and stores it in the memory 3. Meanwhile, the variable-length encoder 12 performs compression encoding of the output of the quantization section 8 and stores the resultant encoded data into the memory 13.

On the contrary, when the encoding mode determination section 5 determines that the frame of data FD is identical to the reference frame of data RFD, the encoding mode determination section 5 instructs the variable-length encoder 12 to produce the header information indicative of the identicalness of the frame of data FD and to store it into the memory 13 (Step SA10).

In this embodiment, since the frames of data FD denoted by 1, 2, 4, 7, and 9 of the frame numbers FN are received from the image input device 1, the encoding mode determination section 5 determines that they are not identical to the reference frame of data RFD and subjected to the compression encoding in different encoding modes.

As the frames of data FD denoted by 3, 5, 6, and 8 of the frame numbers FN are generated by copying the preceding frames of data FD and the encoding mode determination section 5 determines that they are identical to the reference frame of data RFD, they are not subjected to the normal procedure of the compression encoding but transferred to the variable-length encoder 12 where their header data indicating that the frame of data is identical to the reference frame of data, that is, the differential data is zero, is produced before stored into the memory 13.

Subsequently, the frame number addition section 2 determines whether all the frames of data FD received from the image input device 1 have been compression-encoded (Step SA11). When it is determined that all the frames of data FD received from the image input device 1 have been compression-encoded, the frame number addition section 2 ends up the procedure.

When the frame number addition section 2 determines that some frames of data FD received from the image input device 1 have not been compression-encoded, the step of acquiring the time information of the frame of data FD (Step SA1) and the step of adding the frame numbers FN (Step SA2) are repeated until the frame number addition section 2 determines that all the frames of data FD have been compression-encoded before the procedure is terminated.

Figure 7:
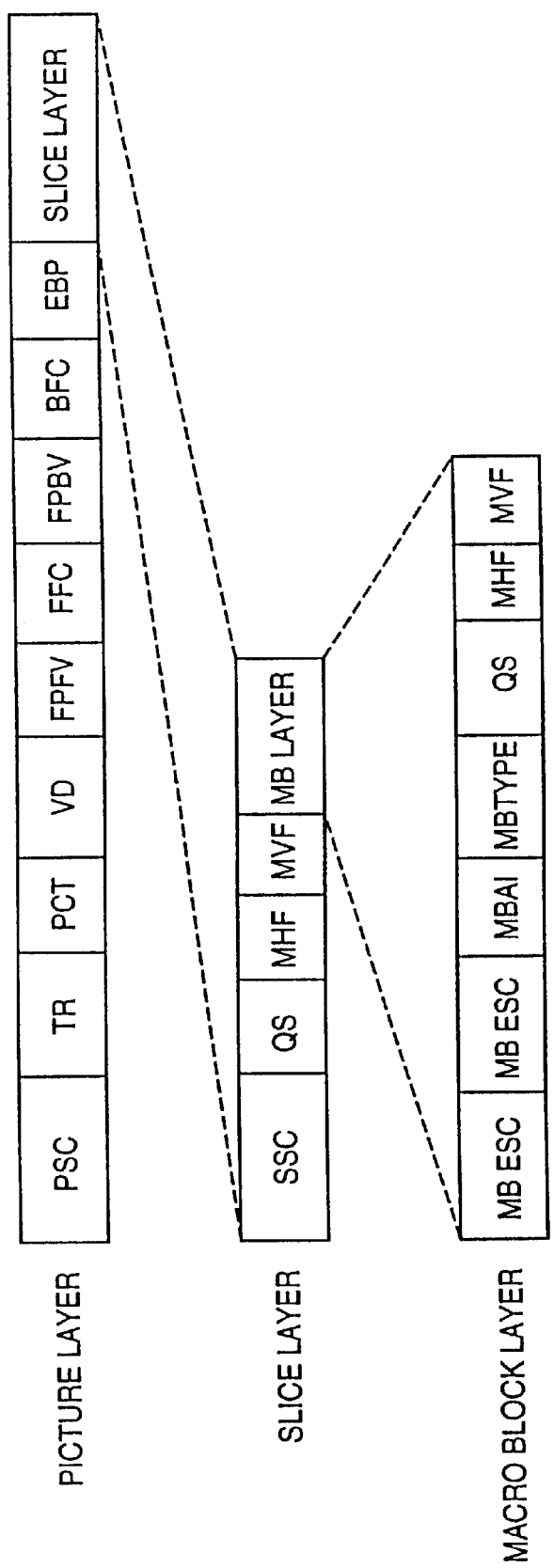
FIG. 7 is a view showing a hierarchical structure of codes in the B-frame of data BFD as shown in FIG. 6.

FIG. 6 illustrates a list of codes of B-frame of data BFD where the differential data is zero and FIG. 7 illustrates a hierarchical structure of the codes of the B-frame of data BFD. In FIG. 6, the symbol (H) at the right end of a code indicates that the numeral is expressed in the hexadecimal notation. Similarly, the symbol (D) indicates that the numeral is expressed in the decimal notation.

The codes in a B-frame of data BFD are, as shown in FIG. 7, classified into three layers: a picture layer, a slice layer, and a macro block (MB) layer. In the picture layer, PSC (picture start code) is a code indicative of starting the picture layer and PCT (picture coding type) indicates the type of a frame of data FD, the B type expressed by "011". In the slice layer, SSC (slice start code) is a code indicative of starting the slice layer.

At the macro block layer, the data to be compression-encoded are represented in units of a block of 16×16 pixels (macro block). MBAI (macroblock address increment) at the macro block layer represents an increment of address from the preceding macro block, hence having "1" at the leading end. MBTYPE (macroblock type) indicates the type of the macro block. When MBP (macroblock pattern) is "0" as shown at the right in the figure, the macro block at the leading end contains no data to be compression-encoded. MBESC (macroblock escape) indicates that non of the data to be compression-encoded exists in 33 macro blocks.

As shown in FIG. 6, two MBESC codes exist in the list. Therefore, it means that no data to be compression-encoded exists throughout 66 macro blocks. In addition, since MBAI is "13" (D), no data to be compression-encoded exists in further 12 macro blocks. Also, "0" of MBP similar to the leading macro block means that no data to be compression-encoded exists in the present macro block.

The B-frame of data BFD as shown in FIG. 6 comprises 80(=1+66+12+1) macro blocks. As explained above, it is apparent that all the macro blocks contain no data to be compression-encoded, i.e. the differential data is zero. In that case, the amount of codes of the B-frame of data BFD where the differential data is zero is expressed by a sum of the bit lengths as shown in FIG. 6, thus carrying 157 bits.

The other codes in FIGS. 6 and 7 can be explained by reading "Advanced MPEG Text" (ASCII Publishing, pp.110–124).

According to this embodiment, even if the frame rate varies, a dropped frame of data is compensated by interpolation before compression encoding. Hence, discrepancy in time information, such as a delay, caused during the playback by changes of the frame rate can be avoided.

Further, the arrangement of this embodiment allows the dropped frame of data FD to be interpolated by copying the preceding frame of data $FD_B$, thus eliminating the time required for compression-encoding the B-frame of data BFD and shortening the overall processing time. In addition, the B-frame of data BFD consists of as a small quantity as 157 bits when the differential data is zero, hence decreasing the overall amount of encoded data. This permits the frame of data FD to be compression-encoded at a higher speed and the amount of reduction is encoded data can be used for the other frame of data FD. Accordingly, the compression encoding ensuring a higher picture quality will be realized.

SECOND EMBODIMENT

Figure 8:
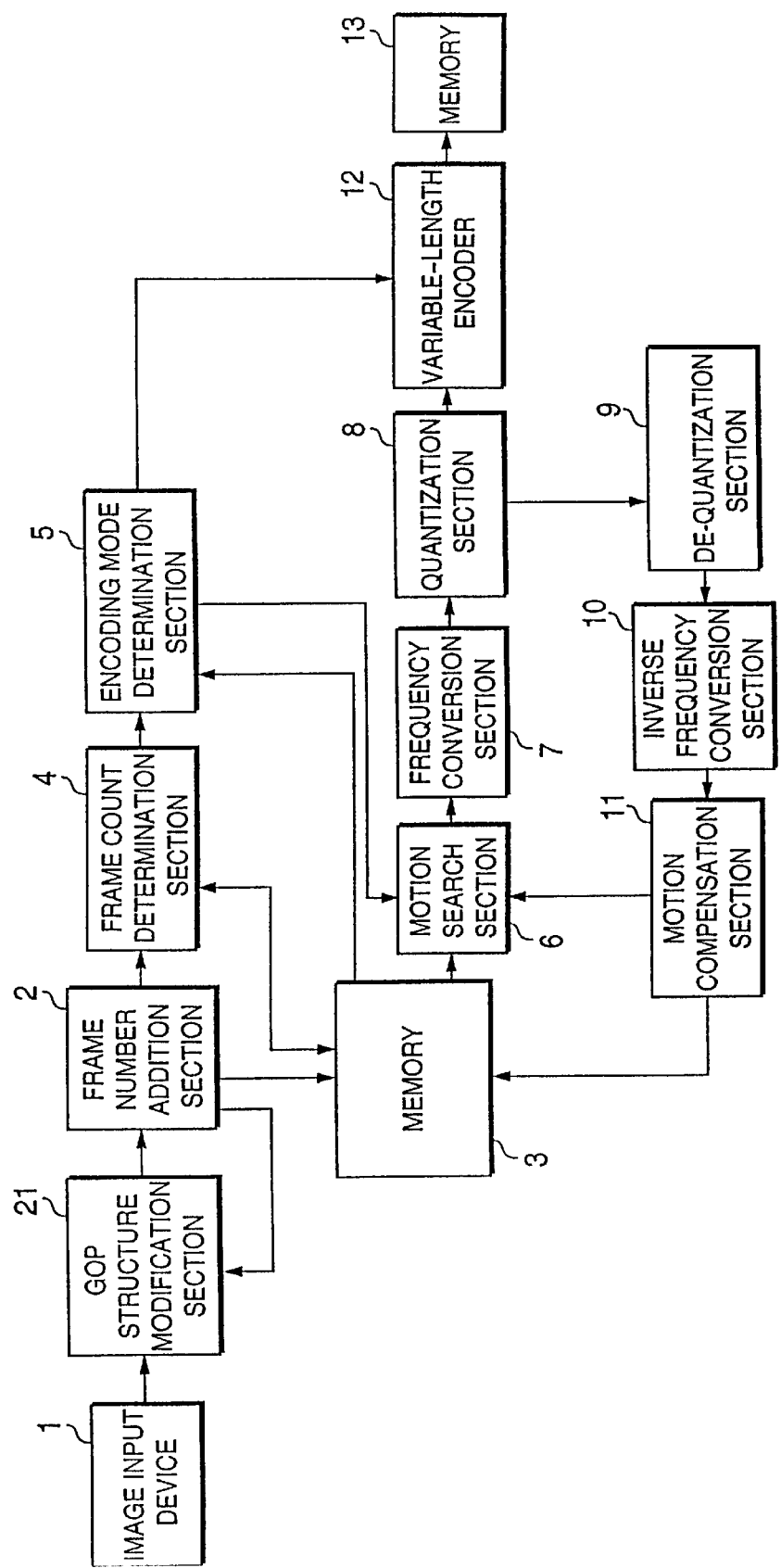
FIG. 8 is a block diagram of an electrical arrangement of a moving picture compressing apparatus showing a second embodiment of the present invention.

FIG. 8 is a block diagram showing an electrical arrangement of a moving picture compressing apparatus according to the second embodiment of the present invention. As shown in FIG. 8, like components as those shown in FIG. 1 are denoted by the same numerals and will be explained in no more detail. The moving picture compressing apparatus of the second embodiment includes a GOP structure modification section 21 disposed between the image input device 1 and the frame number addition section 2.

The GOP structure modification section 21 has a GOP structure table 22 therein as shown in FIG. 9. When the present frame of data $FD_F$ received from the image input device 1 is the frame of data $FD_T$ at the head of the group of pictures GOP, the structure of the group of pictures GOP is modified, with reference to the GOP structure table 22, by comparing between the frame rate designated to the moving picture compressing apparatus and an actual frame rate given from the absolute or relative time information of a plurality of frames of data FD in the preceding group of pictures GOP already received by the frame number addition section 2.

Figure 10:
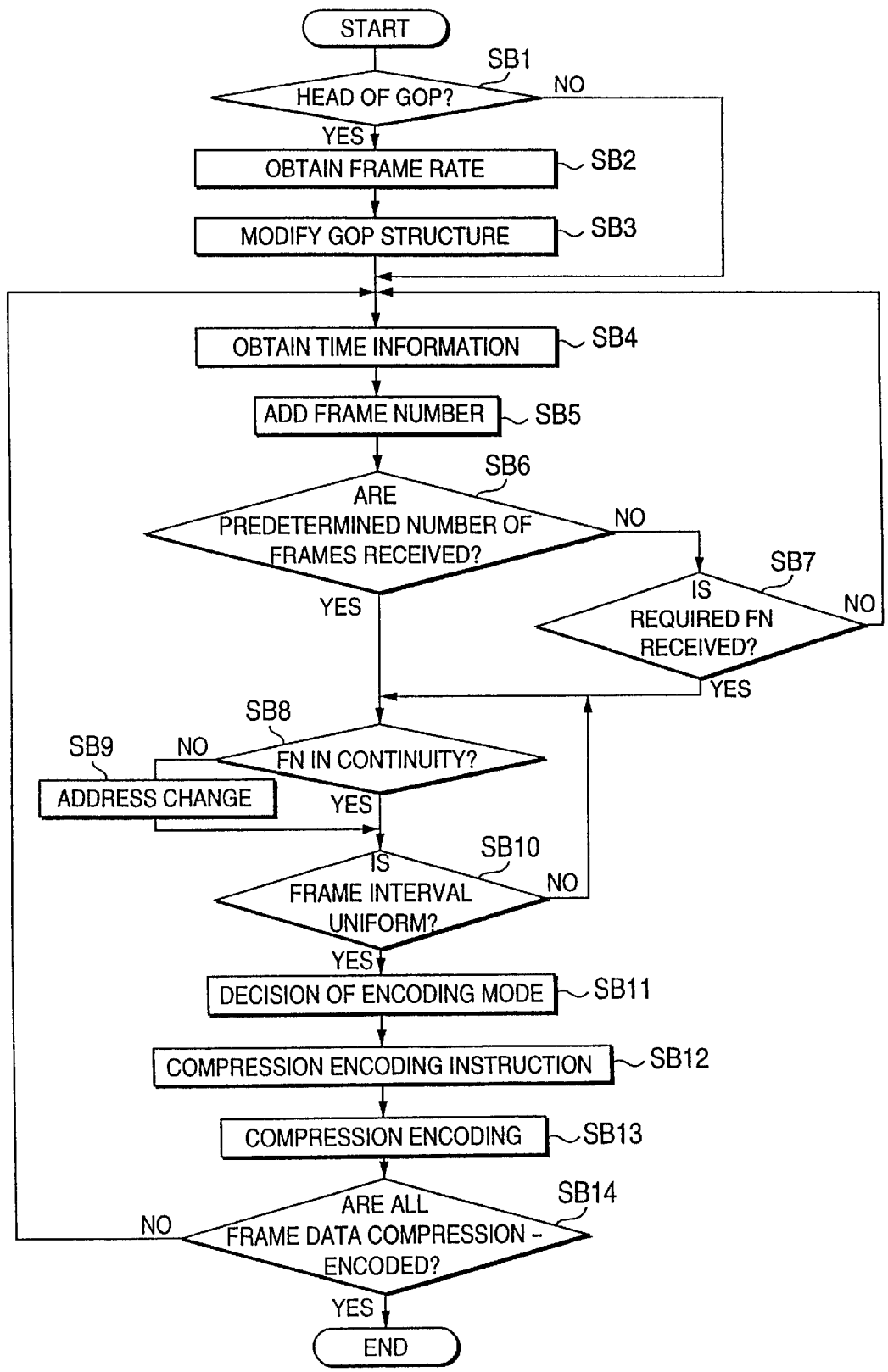
FIG. 10 is a flowchart showing the action of the apparatus.
Figure 11:
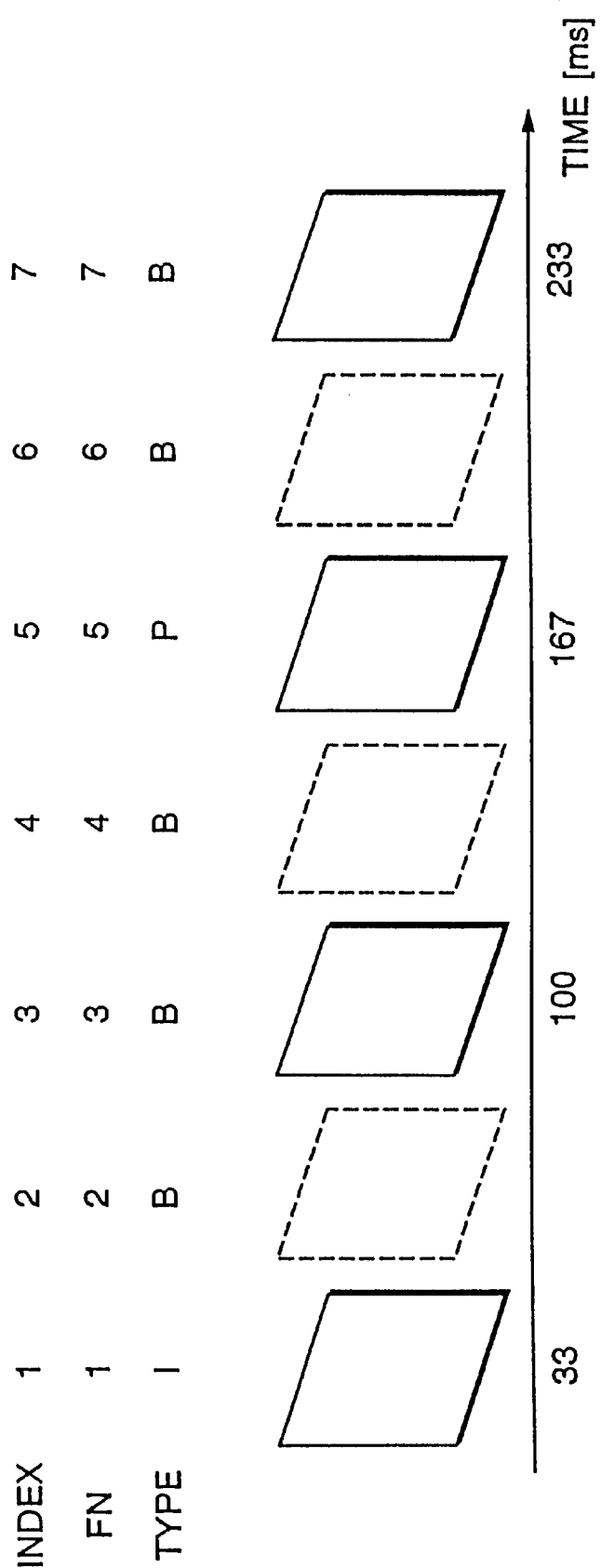
FIG. 11 is a view explaining the action of the apparatus.

An operation of the moving picture compressing apparatus, when a sequence of frames of data FD such as shown in FIG. 11 are received from the image input device 1, will be described referring to the flowchart of FIG. 10. In FIG. 11, a parallelogram denoted by the solid line represents the location on the time axis of a frame of data FD received from the image input device 1 and a parallelogram denoted by the broken line represents the location of a dropped frame of data FD on the time axis. In FIG. 11, the index is a number assigned to a frame of data FD in the group of pictures GOP in the order in which a frame of data is to be received from the leading frame of data regardless of the frame number FN and the type of the frame of data.

It is assumed in this embodiment that the actual frame rate is 15 fps and the frame rate designated to the apparatus is 30 fps, and that the structure GOP at the frame rate of 30 fps consists of IBBBPBBBP . . . as shown in FIG. 11.

Referring to FIG. 10, the GOP structure modification section 21 determines whether the present frame of data $FD_F$ received from the image input device 1 is the frame of data $FD_T$ at the head of the group of pictures GOP to be produced (Step SB1). When it is determined that the frame of data $FD_P$ is not the frame of data $FD_T$, the GOP structure modification section 21 performs nothing and transfers the frame of data $FD_P$ directly to the frame number addition section 2.

When it is determined that the frame of data $FD_P$ is the frame of data $FD_T$, the GOP structure modification section 21 requests and receives the actual frame rate of the preceding group of pictures GOP from the frame number addition section 2 (Step SB2). Here, the actual frame rate is 15 fps. The GOP structure modification section 21 then modifies the structure of the group of pictures GOP by referring to the GOP structure table 22 based on the actual frame rate and the designated frame rate, and then the present frame of data $FD_P$ is supplied to the frame number addition section 3 (Step SB3).

The above steps SB1 to SB3 are performed by the GOP structure modification section 21 because of the following reason.

Figure 12:
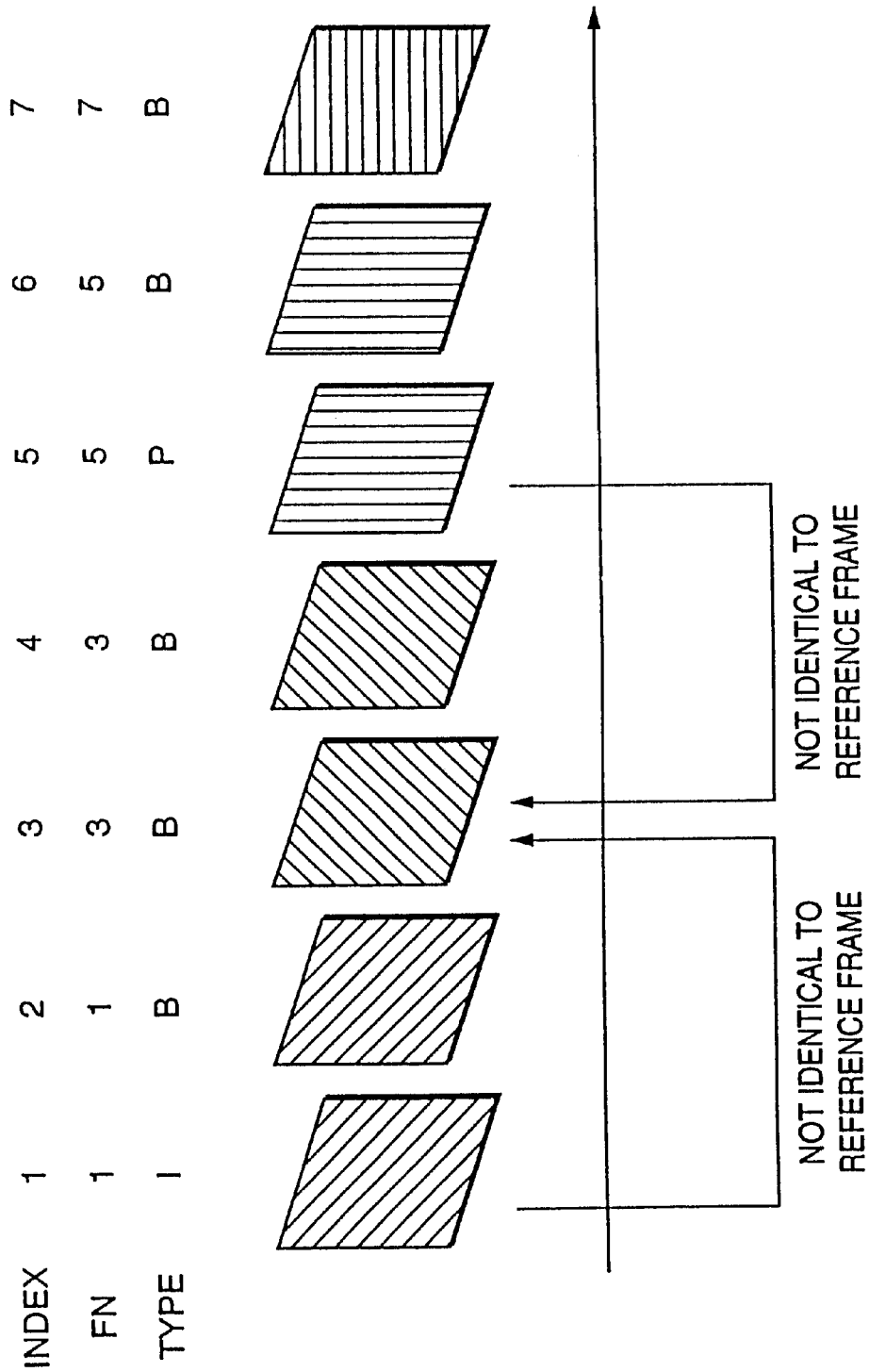
FIG. 12 is a view explaining the action of the apparatus.

If, as in the case of the first embodiment, the preceding frame of data $FD_B$ is simply copied to compensate the dropped frame of data FD without using the GOP structure modification section 21 and also the frame number FN of the frame of data FD interpolated is made equal to the frame number $FN_B$ of the preceding frame of data $FD_B$ to be copied, a sequence of the frames of data FD are produced as shown in FIG. 12 unlike the frames of data FD shown in FIG. 11.

In the case where the structure of GOP is not modified, while the frame of data FD at the index number of 3 is of B type, it is not equal to either the I-frame of data IFD at the index of 1 or the P-frame of data PFD at the index of 5 as the reference frame of data RFD. Taking into account the efficiency and speed of compression, as for the B-frame of data BFD, it is preferable to generate only header information indicating that the differential data is zero using the same information as the reference frame of data RFD.

Hence, this embodiment allows the group of pictures GOP to be adaptively modified so that a dropped B-frame of data BFD has the same data as the preceding frame of data $FD_B$, whereby the efficiency and speed of compression will be Since the actual frame rate is 15 fps and the designated frame rate is 30 fps in this embodiment, the GOP structure modification section 21 modifies the structure of the group of pictures GOP to be produced from IBBBPBBBP . . . to IBPBP . . . by referring to the GOP structure table 22.

Referring to FIG. 10, the frame number addition section 2 acquires the absolute or relative time information of each frame of data FD received from the GOP structure modification section 21 (Step SB4) and provides each frame of data FD with a corresponding frame number FN based on the absolute or relative time information acquired and the frame rate designated to the moving picture compressing apparatus (30 fps in this embodiment) (Step SB5).

In the embodiment as shown in FIG. 11, frames of data FD are received at 33 ms, 100 ms, 167 ms, 233 ms, and 300 ms and their frame numbers FNs are 1 (=(30/1000)×33), 3 (=(30/1000)×100), 5 (=(30/1000)×167), 7 (=(30/1000)× 233), and 9 (=(30/1000)×300), respectively, where it should be noted that "=" indicates that both sides are substantially equal to each other.

The frame number addition section 2 stores the frames of data FD received from the GOP structure modification section 21 and their frame numbers FN into the memory 3 (Step SB5).

This allows the frame count determination section 4 to determine, based on frame numbers FNs sequentially read from the memory 3, whether the predetermined number of frames of data FD required for forming the group of pictures GOP whose structure has been modified by the GOP structure modification section 21 is received (Step SB6). In this case as shown in FIG. 11, seven (7) frames of data FD denoted by the frame numbers 1 to 7 are needed to form the group of pictures GOP during the time interval from the relative time 33 ms to 233 ms. However, only the frames of data FN denoted by the frame numbers 1, 3, 5, and 7 are received by now. In other words, only 4 out of the 7 frames of data FNs numbered 1 to 7 have been received. Accordingly, the frame count determination section 4 determines that the predetermined number (7 in this embodiment) of the frames of data FD are not all received.

The frame count determination section 4, when determining that the predetermined number of the frames of data FD are not all received, further determines whether a frame number higher than the predetermined frame number FN for restoring the group of pictures GOP whose structure has been modified by the GOP structure modification section 21 is received or not (Step SB7). As shown in FIG. 11, the frame of data denoted by the predetermined frame number (FN=7 in this embodiment) which is needed to form the group of pictures GOP has been received. Therefore, the frame count determination section 4 determines that an extra frame number higher than the predetermined frame number FN is supplied.

On the other hand, if an extra frame number higher than the predetermined frame number FN is not supplied, the frame count determination section 4 waits for receiving the succeeding frame number FN.

When the frame count determination section 4 determines that the predetermined number of frames of data FD for forming the group of pictures GOP have been supplied, or that a frame number higher than the predetermined frame number FN has been supplied, the encoding mode determination section 5 determines whether the frame numbers FN stored in the memory 3 are consecutive in the order in which the frames of data FD were supplied (Step SB8). In this stage, since the frame numbers FN are 1, 3, 5, and 7 as shown in FIG. 11, the encoding mode determination section 5 determines that the frame numbers FN are not consecutive. When the frame numbers FN are not consecutive, the encoding mode determination section 5 performs the address change operation of the memory 3 such that the address of the frame of data $FD_P$ denoted by the present frame number $FN_P$, which is lost presently in the memory 3 is made equal to the address of the frame of data $FD_B$ denoted by the preceding frame number $FN_B$ (Step SB9). More specifically, in this embodiment, the address of the frame of data FD denoted by the frame number FN=2 is made equal to the address of the frame of data FD denoted by the frame number FN=1 as shown in FIG. 13.

After it is determined that the frame numbers FN are consecutive or after the address change is completed, the encoding mode determination section 5 determines whether the frame of data FD for forming the group of pictures GOP are aligned at equal intervals (Step SB10). By now, the frame of data FD denoted by the frame number FN=1 is copied to generate the frame of data FD denoted by the frame number FN=2. As the two frames of data FD denoted respectively by the frame numbers FN=4, 6, and 8 are lost, the encoding mode determination section 5 determines that the frames of data FD are not aligned at equal intervals.

When it is determined that the frames of data FD are not aligned at equal intervals (NO in step SA7), the encoding mode determination section 5 repeatedly performs the steps SB8 and SB9 until it is determined that the frames of data FD are positioned at equal intervals.

In this case, the frames of data FD denoted by the frame number FN=4 is made equal in the address of the frame of data FD denoted by the frame number FN=3 and the frame of data FD denoted by the frame number FN=6 is made equal in the address of the frame of data FD denoted by the frame number FN=5.

Therefore, the frames of data FD denoted by the frame numbers FN=2, 4, and 6 are each made equal to the preceding frame data $FD_B$ which should be a reference frame of data RFD.

When it is determined that the frame of data FD are positioned at equal intervals (YES in step SB10), the encoding mode determination section 5 determines the encoding mode of the predetermined number of frames of data FD which have been pre-processed, based on their type and frame numbers FN (Step SB11). The group of pictures GOP in this embodiment has been modified by the GOT structure modification section 21 such that it consists mainly of one I-frame of data IFD, three B-frames of data BFD, and three P-frames of data PFD. Accordingly, the encoding mode determination section 5 selects the intra-frame encoding mode for the I-frame of data IFD denoted by FN=1, the inter-frame encoding mode with motion compensation prediction for the B-frames of data BFD denoted by FN=2, 4, and 6, and the inter-frame encoding mode with motion compensation prediction for the P-frames of data PFD denoted by FN=3, 5, and 7.

The encoding mode determination section 5 further determines whether the frame of data FD to be compression-encoded is identical to its reference frame of data RFD stored in the memory 3. If it is determined that the frame of data FD is not identical to the reference frame of data RFD, then the encoding mode determination section 5 instructs the sections downstream from the motion search section 6 to carry out a normal procedure of the compression encoding (SB13). If it is determined that the frame of data FD is identical to the reference frame of data RFD, then the encoding mode determination section 5 instructs the variable-length encoder 12 to generate header data indicative of the same frame of data FD (Step SB12). The compression-encoding and header generation processes (step B12) is the same as the step SA10 in the first embodiment. Therefore, the details thereof are omitted.

In this embodiment, since the frames of data FD denoted by 1, 3, 5, and 7 of the frame numbers FN are received from the image input device 1, the encoding mode determination section 5 determines that they are not identical to the reference frame of data RFD and subjected to the compression encoding in different encoding modes.

As the frames of data FD denoted by 2, 4, and 6 of the frame numbers FN are generated by copying the preceding frames of data FD and the encoding mode determination section 5 determines that they are identical to the reference frame of data RFD, they are not subjected to the normal procedure of the compression encoding but transferred to the variable-length encoder 12 where their header data indicating that the frame of data is identical to the reference frame of data, that is, the differential data is zero, is produced before stored into the memory 13.

Subsequently, the frame number addition section 2 determines whether all the frames of data FD received from the image input device 1 have been compression-encoded (Step SB14). When it is determined that all the frames of data FD received from the image input device 1 have been compression-encoded, the frame number addition section 2 ends up the procedure.

When the frame number addition section 2 determines that some frames of data FD received from the image input device 1 have not been compression-encoded, the step of acquiring the time information of the frame of data FD (Step SB4) and the step of adding the frame numbers FN (Step SB5) are repeated until the frame number addition section 2 determines that all the frames of data FD have been compression-encoded before the procedure is terminated.

As explained above, the arrangement of this embodiment allows the structure of the group of pictures GOP to be modified on the basis of the actual frame rate and the frame rate designated to the apparatus. This will improve the efficiency and speed of the compression encoding in addition to the advantage of the first embodiment.

It is understood that the present invention is not limited to the embodiments which are described above referring to the accompanying drawings and other modifications and changes in the its design and arrangement may be made without departing from the scope of the present invention.

For example, although the compression-encoded data are stored into the memory 13 according to the embodiment, they are not of limitations but may be transferred via a dedicated transmission line to the outside.

The embodiments of the present invention are adapted but not limited to that the video signal received from a video camera of the NTSC system is processed by the image input device 1 to produce the frame of data FD which is then subjected to the compression encoding of MPEG1 system. It is apparent that the present invention may also be applied with equal success to the compression encoding of the frame of data FD of a video signal received from an image capture means such as a video camera of any other television system including the PAL system or for any other compression encoding system such as MPEG2. Also, the present invention is applicable to the compression encoding on a field-data basis.

The embodiments of the present invention are composed of but not limited to hardware means. More particularly, the moving picture compressing apparatus of the embodiment may be a computer comprising a CPU (central processing unit), an internal memory device such as a ROM or a RAM, an external memory device such as an FDD (floppy disk driver), an HDD (hard disk driver), or a CD-ROM driver, an output means, and an input device. For example, while the CPU includes a combination of the frame number addition section 2, the frame count determination section 4, the encoding mode determination section 5, the motion search section 6, the frequency conversion section 7, the quantization section 8, the de-quantization section 9, the inverse frequency conversion section 10, the motion compensation section 11, the variable-length encoder 12, and the GOP structure modification section 21, their functions are stored as moving picture compressing programs in the storage means including semiconductor memories such as ROMs, FDs, HDs, and CD-ROMs.

In that case, the internal or external memory device preferably has the memory 3 and 13 and the GOP structure table 22, and the moving picture compressing program may be read out from the memory device and transferred to the CPU for controlling the functions. When the moving picture compressing programs are started, the CPU functions as the frame number addition section 2, the frame count determination section 4, the encoding mode determination section 5, the motion search section 6, the frequency conversion section 7, the quantization section 8, the de-quantization section 9, the inverse frequency conversion section 10, the motion compensation section 11, the variable-length encoder 12, and the GOP structure modification section 21. The operation of the CPU is controlled by the moving picture compressing programs running thereon.

According to the above mentioned arrangement, even when the low processing speed of a CPU (central processing unit) or a heavy load on the CPU due to multitask processing in parallel causes the speed of receiving the picture data to be decreased or prevents the picture data from being received at a constant speed thus to produce a change in frame rate, any discrepancy such as a delay in the time information caused by the change in the frame rate in the playback will be avoided.

Also, when a heavy load to the CPU retards the speed of receiving the moving pictures, reduction of the data to be processed enables to improve the efficiency and speed of compression process hence decreasing the overall time required for the compression encoding. As a result, the moving pictures can be compression-encoded in real time.

As set forth above, the arrangement of the present invention permits the data to be compression-encoded after its dropped frames have been interpolated. Therefore, even if the frame rate is changed, any discrepancy such as a delay in the time information which may be caused by the change in the frame rate can be prevented.

Also, according to the arrangement of the present invention, a dropped frame is restored by copying the preceding frame and thus the compression encoding of the present frame is not needed hence decreasing the overall processing time. In addition, the amount of data which indicates the identicalness of the frames is small and the overall amount of the data will successfully be reduced. This allows the compression encoding of the frames to be carried out at a higher speed and the amount of data saved by the reduction can be used for the other frames, hence ensuring the compression encoding of a high picture quality.

According to the other arrangement of the present invention, the structure of an group of pictures is dynamically modified in response to the actual frame rate. hence decreasing the amount of the data to be processed and increasing the efficiency and speed of the compression processing to minimize the overall time required for the compression encoding.

What is claimed is:

1. A method for compression-encoding a moving picture supplied in real time, wherein the moving picture is divided in units of a group of pictures consisting of a plurality of frames, the method comprising the steps of:
    a) determining whether a predetermined number of frames required for forming a group of pictures have been inputted;
    b) compensating for each dropped frame by interpolating a preceding frame previous to the dropped frame into an interpolated frame represented by information indicting that the interpolated frame is identical to the preceding frame to produce an interpolated group of pictures when the predetermined number of frames have not been all supplied; and
    c) compression-encoding each frame of the interpolated group of pictures to produce encoded moving picture data.

2. A method for compression-encoding a moving picture supplied in real time, wherein the moving picture is divided in units of a group of pictures consisting of a predetermined number of frames, the method comprising the steps of:
    a) adding a frame number to each frame of the moving picture based on time information for each frame and a predetermined frame rate;
    b) determining whether the predetermined number of frames required for forming a group of pictures have been all inputted, by referring to a frame number of each frame;
    c) compensating for each dropped frame by interpolating a preceding frame previous to the dropped frame into an interpolated frame represented by information indicting that the interpolated frame is identical to the preceding frame to produce an interpolated group of pictures when the predetermined number of frames have not been all inputted; and
    d) compression-encoding each frame of the interpolated group of pictures to produce encoded moving picture data to be stored.

3. The storage medium according to claim 2, wherein the step b) comprises the steps of:
    b.1) determining whether the predetermined number of frames required for forming a group of pictures have been inputted, by referring to a frame number of each frame;
    b.2) when the predetermined number of frames have not been inputted, determining whether a predetermined frame number required for forming a group of pictures has been inputted, by referring to a frame number of each frame; and
    b.3) in one of cases where the predetermined number of frames have been inputted and where the predetermined frame number has been inputted, determining whether frame numbers added respectively to inputted frames are consecutive and the inputted frames are uniformly spaced in time, and the step c) comprises the steps of:
    c.1) when the frame numbers added respectively to the inputted frames are not consecutive, compensating for each dropped frame by interpolating a preceding frame previous to the dropped frame into an interpolated frame represented by information indicting that the interpolated frame is identical to the preceding frame to produce an interpolated group of pictures; and
    c.2) repeating the step c.1) until the inputted frames are uniformly spaced in time.

4. A method for compression-encoding a moving picture supplied in real time, wherein the moving picture is divided in units of a group of pictures consisting of a predetermined number of frames, comprising the steps of:
    a) determining whether a current frame is a head of a group of pictures;
    b) when the current frame is the head of the group of pictures, obtaining an actual frame rate measured in a previous group of pictures;
    c) modifying a structure of the group of pictures depending on a combination of the actual frame rate and a predetermined frame rate;
    d) adding a frame number to each frame of the moving picture based on time information for each frame and the predetermined frame rate;
    e) determining whether the predetermined number of frames required for forming a group of pictures have been all inputted, by referring to a frame number of each frame;
    f) when the predetermined number of frames have not been all inputted, compensating for a dropped frame by interpolation of a proceeding frame previous to the dropped frame to produce an interpolated group of pictures; and
    g) compression-encoding each frame of the interpolated group of pictures to produce encoded moving picture data to be stored.

5. The method according to claim 4, wherein a type of each frame of a group of pictures is one of Intra type, Predictive type, and Bidirectionally predictive type, wherein, in the step c), the structure of the group of pictures is modified such that an interpolated frame is of Bidirectionally predictive type.

6. The method according to claim 4, wherein, in the step g), an interpolated frame is represented by information indicating that it is identical to the proceeding frame.

7. The method according to claim 5, wherein, in the step g), an interpolated frame is represented by information indicating that it is identical to the proceeding frame.

8. An apparatus for compression-encoding a moving picture supplied in real time, wherein the moving picture is divided in units of a group of pictures consisting of a plurality of frames, the apparatus comprising:
    a determiner for determining whether a predetermined number of frames required for forming a group of pictures have been inputted;
    a compensator for compensating for each dropped frame by interpolating a preceding frame previous to the dropped frame into an interpolated frame represented by information indicting that the interpolated frame is identical to the preceding frame to produce an interpolated group of pictures when the predetermined number of frames have not been all inputted;

an encoder for compression-encoding each frame of the interpolated group of pictures to produce encoded moving picture data; and a storage for storing the encoded moving picture data.

9. An apparatus for compression-encoding a moving picture supplied in real time, wherein the moving picture is divided in units of a group of pictures consisting of a predetermined number of frames, the apparatus comprising:

a frame number adder for adding a frame number to each frame of the moving picture based on time information for each frame and a predetermined frame rate;

a determiner for determining whether the predetermined number of frames required for forming a group of pictures have been all inputted, by referring to a frame number of each frame;

a compensator for compensating for each dropped frame by interpolating a preceding frame previous to the dropped frame into an interpolated frame represented by information indicting that the interpolated frame is identical to the preceding frame to produce an interpolated group of pictures when the predetermined number of frames have not been all inputted;

an encoder for compression-encoding each frame of the interpolated group of pictures to produce encoded moving picture data; and a storage for storing the encoded moving picture data.

10. An apparatus for compression-encoding a moving picture supplied in real time, wherein the moving picture is divided in units of a group of pictures (GOP) consisting of a predetermined number of frames, comprising:

a GOP modifier for modifying a structure of the group of pictures depending on a combination of an actual frame rate and a predetermined frame rate, when a current frame is a head of the group of pictures, wherein the actual frame rate was measured in a previous group of pictures;

a frame number adder for adding a frame number to each frame of the moving picture based on time information for each frame and a predetermined frame rate;

a determiner for determining whether the predetermined number of frames required for forming a group of pictures have been all inputted, by referring to a frame number of each frame;

a compensator for compensating for a dropped frame by interpolation of a proceeding frame previous to the dropped frame to produce an interpolated group of pictures, when the predetermined number of frames have not been all inputted;

an encoder for compression-encoding each frame of the interpolated group of pictures to produce encoded moving picture data; and a storage for storing the encoded moving picture data.

11. The apparatus according to claim 10, wherein a type of each frame of a group of pictures is one of Intra type, Predictive type, and Bidirectionally predictive type, wherein the modifier modifies the structure of the group of pictures such that an interpolated frame is of Bidirectionally predictive type.

12. The apparatus according to claim 10, wherein the compensator compensates for the dropped frame by using information indicating that the dropped frame is identical to the proceeding frame, and then the information indicating that the dropped frame is identical to the proceeding frame is stored into the storage in place of the interpolated frame.

13. The apparatus according to claim 11, wherein the compensator compensates for the dropped frame by using information indicating that the dropped frame is identical to the proceeding frame, and then the information indicating that the dropped frame is identical to the proceeding frame is stored into the storage in place of the interpolated frame.

14. A storage medium storing a computer program for compression-encoding a moving picture supplied in real time, wherein the moving picture is divided in units of a group of pictures consisting of a plurality of frames, the computer program comprising the steps of:

a) determining whether a predetermined number of frames required for forming a group of pictures have been inputted;

b) compensating for each dropped frame by interpolating a preceding frame previous to the dropped frame into an interpolated frame represented by information indicting that the interpolated frame is identical to the preceding frame to produce an interpolated group of pictures when the predetermined number of frames have not been all supplied; and c) compression-encoding each frame of the interpolated group of pictures to produce encoding moving picture data.

15. A storage medium storing a computer program for compression-encoding a moving picture supplied in real time, wherein the moving picture is divided in units of a group of pictures consisting of a predetermined number of frames, the computer program comprising the steps of:

a) adding a frame number of each frame of the moving picture based on time information for each frame and a predetermined frame rate;

b) determining whether the predetermined number of frames required for forming a group of pictures have been all inputted, by referring to a frame number of each frame;

c) compensating for each dropped frame by interpolating a preceding frame previous to the dropped frame into an interpolated frame represented by information indicting that the interpolated frame is identical to preceding frame to produce an interpolated group of pictures when the predetermined number of frames have not been all inputted; and d) compression-encoding each frame of the interpolated group of pictures to produce encoded moving picture data to be stored.

16. The storage medium according to claim 15, wherein the step b) comprises the steps of:

b.1) determining whether the predetermined number of frames required for forming a group of pictures have been inputted, by referring to a frame number of each frame;

b.2) when the predetermined number of frames have not been inputted, determining whether a predetermined frame number required for forming a group of pictures has been inputted, by referring to a frame number of each frame; and b.3) in one of cases where the predetermined number of frames have been inputted and where the predetermined frame number has been inputted, determining whether frame numbers added respectively to inputted frames are consecutive and the inputted frames are uniformly spaced in time, and the step c) comprises the steps of:

c.1) when the frame numbers added respectively to the inputted frames are not consecutive, compensating for each dropped frame by interpolating a preceding frame previous to the dropped frame into an interpolated frame represented by information indicting that the interpolated frame is identical to the preceding frame to produce an interpolated group of pictures; and c.2) repeating the step c.1) until the inputted frames are uniformly spaced in time.

17. A storage medium storing a computer program for compression-encoding a moving picture supplied in real time, wherein the moving picture is divided in units of a group of pictures consisting of a predetermined number of frames, the computer program comprising the steps of:

a) determining whether a current frame is a head of a group of pictures;

b) when the current frame is the head of the group of pictures, obtaining an actual frame rate measured in a previous group of pictures;

c) modifying a structure of the group of pictures depending on a combination of the actual frame rate and a predetermined frame rate;

d) adding a frame number to each frame of the moving picture based on time information for each frame and the predetermined frame rate;

e) determining whether the predetermined number of frames required for forming a group of pictures have been all inputted, by referring to a frame number of each frame;

f) when the predetermined number of frames have not been all inputted, compensating for a dropped frame by interpolation of a proceeding frame previous to the dropped frame to produce an interpolated group of pictures; and g) compression-encoding each frame of the interpolated group of pictures to produce encoded moving picture data to be stored.

* * * * *